US009500536B2

(12) United States Patent
Suzuki et al.

(10) Patent No.: US 9,500,536 B2
(45) Date of Patent: Nov. 22, 2016

(54) TEMPERATURE SENSOR

(71) Applicant: NGK SPARK PLUG CO. LTD., Aichi (JP)

(72) Inventors: Tatsuya Suzuki, Kasugai (JP); Masamichi Ito, Iwakura (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 531 days.

(21) Appl. No.: 14/043,207

(22) Filed: Oct. 1, 2013

(65) Prior Publication Data

US 2014/0092940 A1  Apr. 3, 2014

(30) Foreign Application Priority Data

Oct. 1, 2012 (JP) .................................. 2012-219337
Aug. 12, 2013 (JP) .................................. 2013-167256

(51) Int. Cl.
*G01K 7/22* (2006.01)

(52) U.S. Cl.
CPC ...................................... *G01K 7/22* (2013.01)

(58) Field of Classification Search
CPC ........................................................ G01K 7/22
USPC ........................................................ 374/185
See application file for complete search history.

(56) References Cited

U.S. PATENT DOCUMENTS

| 6,130,598 | A | * | 10/2000 | Katsuki | ..................... | G01K 1/16 |
| | | | | | | 338/229 |
| 6,264,363 | B1 | | 7/2001 | Takahashi et al. | | |
| 7,855,632 | B1 | * | 12/2010 | Schuh | ..................... | G01K 1/08 |
| | | | | | | 338/28 |
| 8,591,104 | B2 | * | 11/2013 | Suzuki | ................. | B23K 26/127 |
| | | | | | | 374/163 |
| 2004/0218662 | A1 | * | 11/2004 | Hanzawa | ............... | G01K 13/02 |
| | | | | | | 374/185 |
| 2009/0168842 | A1 | | 7/2009 | Yokoi et al. | | |
| 2009/0236321 | A1 | | 9/2009 | Hayashi et al. | | |
| 2009/0323765 | A1 | * | 12/2009 | Yokoi | ..................... | G01K 7/22 |
| | | | | | | 374/185 |
| 2011/0228812 | A1 | | 9/2011 | Suzuki et al. | | |

FOREIGN PATENT DOCUMENTS

| JP | 10-334956 A | 12/1998 |
| JP | 2000-97781 A | 4/2000 |

(Continued)

OTHER PUBLICATIONS

Communication dated Apr. 13, 2015 from the Japanese Patent Office in counterpart application No. 2013-167256.

*Primary Examiner* — Lisa Caputo
*Assistant Examiner* — Philip Cotey
(74) *Attorney, Agent, or Firm* — Sughrue Mion, PLLC

(57) ABSTRACT

A temperature sensor includes a pair of element electrode wires extending rearward from a temperature-sensing portion. A pair of second electrode wires are welded to the element s electrode wires, and made of a kind of metal having a different thermal expansion coefficient than the element electrode wires. Each second electrode wire includes an overlap section overlapping with an overlap section of the corresponding element electrode wire over an overlap region in a longitudinal direction in which the overlap sections of the each second electrode wire and element electrode wire extend longitudinally. The overlap section of each second electrode wire is welded to the overlap section of the corresponding element electrode wire at weld zones arranged in the longitudinal direction, which include: one at a front-side end of the overlap region; and another at a rear-side end of the overlap region.

8 Claims, 3 Drawing Sheets

(56) References Cited

FOREIGN PATENT DOCUMENTS

| | | |
|---|---|---|
| JP | 2001-47244 A | 2/2001 |
| JP | 2002-168702 A | 6/2002 |
| JP | 2004-148333 A | 5/2004 |
| JP | 2007-136489 A | 6/2007 |
| JP | 2009-175129 A | 8/2009 |
| JP | 2009-291838 A | 12/2009 |
| JP | 2009-294107 A | 12/2009 |
| JP | 2011-2354 A | 1/2011 |
| KR | 10-2011-0106274 A | 9/2011 |

* cited by examiner

TEMPERATURE SENSOR

BACKGROUND OF THE INVENTION

The present invention relates to a temperature sensor including a temperature-sensing element such as a thermistor element or a platinum (Pt) resistance element.

Japanese Patent Application Publication No. 2009-294107 discloses a temperature sensor for sensing temperature of exhaust gas or the like of a motor vehicle or the like, wherein the temperature sensor uses a phenomenon that resistance of a thermistor or platinum resistance element varies according to its temperature. In such a temperature sensor, a thermistor element for temperature sensing includes a thermistor sintered body and a pair of element electrode wires made of platinum or the like. As shown in FIG. 3 of this document, each element electrode wire and a corresponding one of sheath core wires (electrode wires) are set to extend in a longitudinal direction, and overlap with each other in the longitudinal direction, and welded to each other at two points, for taking an electric signal from the thermistor element. The welded product is installed inside a protector tube that is a tube having a bottom and is made of metal; the remaining internal space is filled with a kind of cement such as aluminum cement; and lead wires are taken out through a rear end opening of the protector tube, wherein the lead wires are connected to the sheath core wires, thus completing the temperature sensor.

SUMMARY OF THE INVENTION

In the temperature sensor described above where each element electrode wire is welded to the corresponding sheath core wire at two points which are arranged in the longitudinal direction, the capability of binding the overlap sections of the two wires falls as the distances from the two weld zones to the respective closer longitudinal ends of the overlap region increase. Accordingly, if the distances are large so that the capability of binding is low, a significant vibration may occur and cause a significant stress on the weld zones and thereby break the weld zones. Especially, in cases where the temperature sensor is mounted to a motor vehicle or an exhaust pipe of an internal combustion engine or the like, the temperature sensor is subject to vibrations and thermal cycling. This may cause vibrations in directions perpendicular to the longitudinal direction, and cause repetition of thermal expansion and contraction, and thereby cause the welded portion of the element electrode wire and the welded portion of the sheath core wire to be separated from each other.

In view of the foregoing, it is desirable to provide a temperature sensor which is capable of operating normally even under such severe conditions as described above, suppressing stresses and damages from being applied to welded zones between an element electrode wire of a temperature-sensing element and an electrode wire for taking an electric signal from the temperature-sensing element.

According to one aspect of the present invention, a temperature sensor comprises: a temperature-sensing element including: a temperature-sensing portion; and a pair of element electrode wires extending rearward from the temperature-sensing portion; and a pair of second electrode wires welded to corresponding ones of the element electrode wires for taking an electric signal out of the temperature-sensing element, and made of a kind of metal having a different thermal expansion coefficient than the element electrode wires; wherein: each second electrode wire includes an overlap section overlapping with an overlap section of the corresponding element electrode wire over an overlap region in a longitudinal direction in which the overlap section of the each second electrode wire and the overlap section of the corresponding element electrode wire extend longitudinally; the overlap section of each second electrode wire is welded to the overlap section of the corresponding element electrode wire at a plurality of weld zones, wherein the plurality of weld zones are arranged in the longitudinal direction; and the plurality of weld zones include: a front-side weld zone at a front-side longitudinal end of the overlap region closer to the temperature-sensing portion; and a rear-side weld zone at a rear-side longitudinal end of the overlap region farther from the temperature-sensing portion. The temperature sensor may be configured so that: the front-side weld zone is formed to extend from a front-side longitudinal end surface of the each second electrode wire to the corresponding element electrode wire, and reach the overlap section of the corresponding element electrode wire; and the rear-side weld zone is formed to extend from a rear-side longitudinal end surface of the corresponding element electrode wire to the each second electrode wire, and reach the overlap section of the each second electrode wire. The temperature sensor may be configured so that the plurality of weld zones include another weld zone. The temperature sensor may be configured so that the plurality of weld zones include a central weld zone at a substantially central position between the front-side weld zone and the rear-side weld zone in the longitudinal direction. The temperature sensor may be configured so that the plurality of weld zones are substantially evenly spaced in the longitudinal direction.

DETAILED DESCRIPTION OF THE INVENTION

Figure 1:
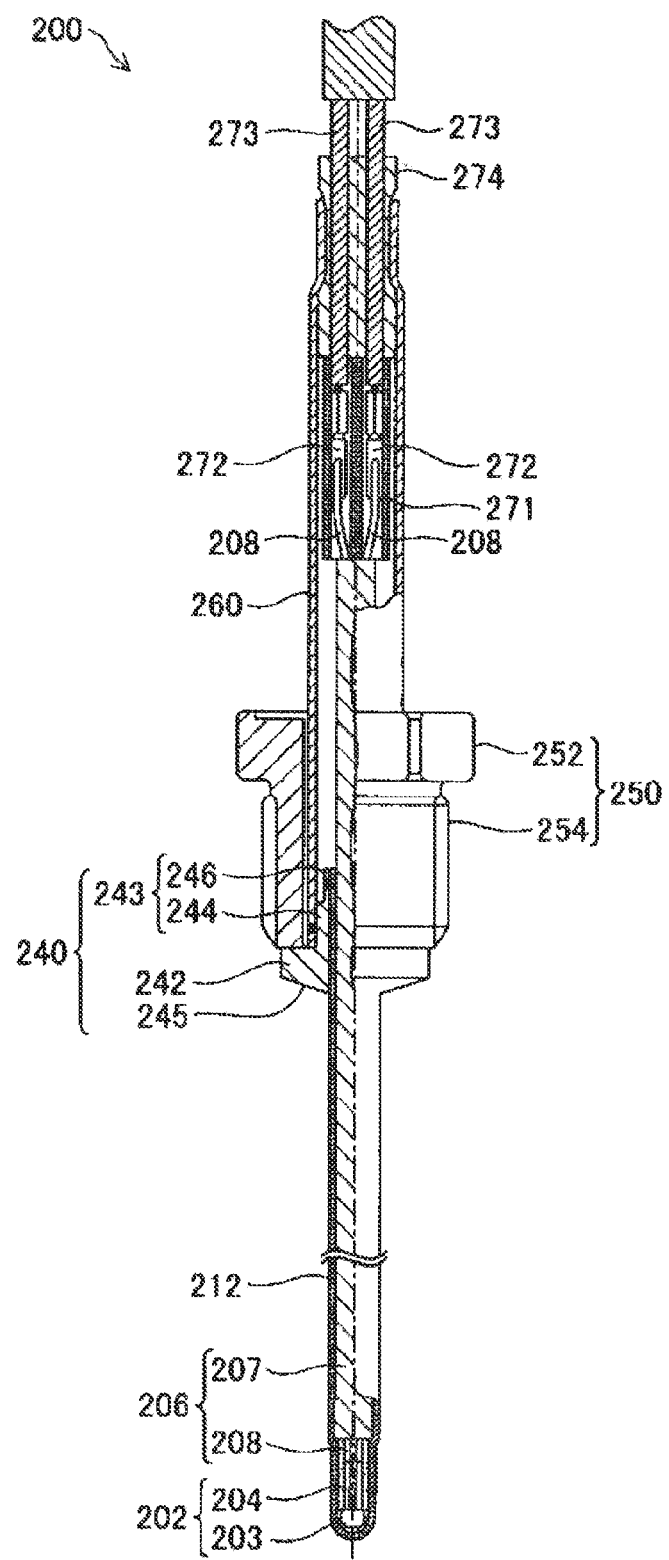
FIG. 1 is a partial cross-sectional view of a temperature sensor according to a first embodiment of the present invention taken along a plane containing a longitudinal direction of the temperature sensor.

FIG. 1 shows a partial cross-sectional view of a temperature sensor 200 according to a first embodiment of the present invention taken along a plane containing a longitudinal direction of the temperature sensor 200. The temperature sensor 200 is mounted to an opening of a wall of an exhaust pipe not shown or the like for sensing the temperature of exhaust gas or the like of a motor vehicle.

As shown in FIG. 1, the temperature sensor 200 generally includes a metal tube 212, a mounting member 240, a nut member 250, and a tubular member 260. The metal tube 212 has a closed front longitudinal end and an open rear longitudinal end, and extends in the axial or longitudinal direction of the temperature sensor 200. The mounting member 240 is joined to a rear end portion of the metal tube 212. The nut member 250 is provided separately from the mounting member 240, and has a hexagonal nut portion 252 and a threaded portion 254. The tubular member 260 encloses at least a portion of a sheath member 206 described below, and has a front longitudinal end portion jointed to the mounting member 240, and extends in the longitudinal direction. In FIG. 1, the vertical direction corresponds to the longitudinal direction of the temperature sensor 200, wherein the front side of the temperature sensor 200 is shown on the lower side of FIG. 1, and the rear side of the temperature sensor 200 is shown on the upper side of FIG. 1.

The temperature sensor 200 has a thermistor element 202 provided within the metal tube 212. The thermistor element 202 includes a thermistor sintered-body 203 and element electrode wires 204. The temperature sensor 200 is attached to an exhaust pipe of an internal combustion engine in such a manner that the thermistor element 202 is disposed within the exhaust pipe in which exhaust gas flows, whereby the temperature sensor 200 can detect the temperature of the exhaust gas.

The sheath member 206 is configured such that two sheath core wires 208 are electrically insulatively held in the interior of a sheath tube 207, and disposed internally of the metal tube 212, the mounting member 240, and the tubular member 260. The portions of the sheath core wires 208 extending from the front end of the sheath tube 207 are joined to the element electrode wires 204 of the thermistor element 202 through formation of weld zones by means of laser welding. On the other hand, the portions of the sheath core wires 208 extending from the rear end of the sheath tube 207 are connected via crimp terminals 272 to lead wires 273 for connection to an external circuit (e.g., an electronic control unit (ECU) of the vehicle). Insulation tubes 271 electrically insulate the portions of the sheath core wires 208 extending from the rear end of the sheath tube 207 from each other, and the crimp terminals 272 from each other. The lead wires 273 are configured by covering a conductor with an isolative covering material, and are disposed to extend through a seal member 274 made of heat-resisting rubber.

The mounting member 240 includes a tubular sheath portion 243 extending in the longitudinal direction, and a flange portion 242 located frontward of the sheath portion 243. The flange portion 242 has an outside diameter greater than that of the sheath portion 243, and projects radially outward. The sheath portion 243 has a two-stepped shape consisting of: a first stepped portion 244 located on the front side; and a second stepped portion 246 located on the rear side and having an outside diameter smaller than that of the first stepped portion 244. Through radially performed full-circle laser welding, the tubular member 260 and the first stepped portion 244 are is joined together, and the second stepped portion 246 and the outer peripheral surface of the metal tube 212 are joined together. The front end of the flange portion 242 is formed into a mounting seat 245 which is tapered such that the diameter of the mounting seat 245 reduces gradually in the frontward direction. The mounting seat 245 is fitted to a tapered portion of the exhaust pipe at a sensor mounting position. The mounting seat 245 is in direct and close contact with the tapered portion of the exhaust pipe, thereby preventing leakage of exhaust gas to the exterior of the exhaust pipe.

The nut member 250 is fitted to the tubular member 260 in such a manner as to be rollable around the periphery of the tubular member 260. After the mounting seat 245 is disposed in contact with a taper surface at the sensor mounting position, the threaded portion 254 of the nut member 250 is threadingly engaged with a thread groove formed around the sensor mounting position, whereby the mounting member 240 is fixed at the sensor mounting position.

Figure 2:
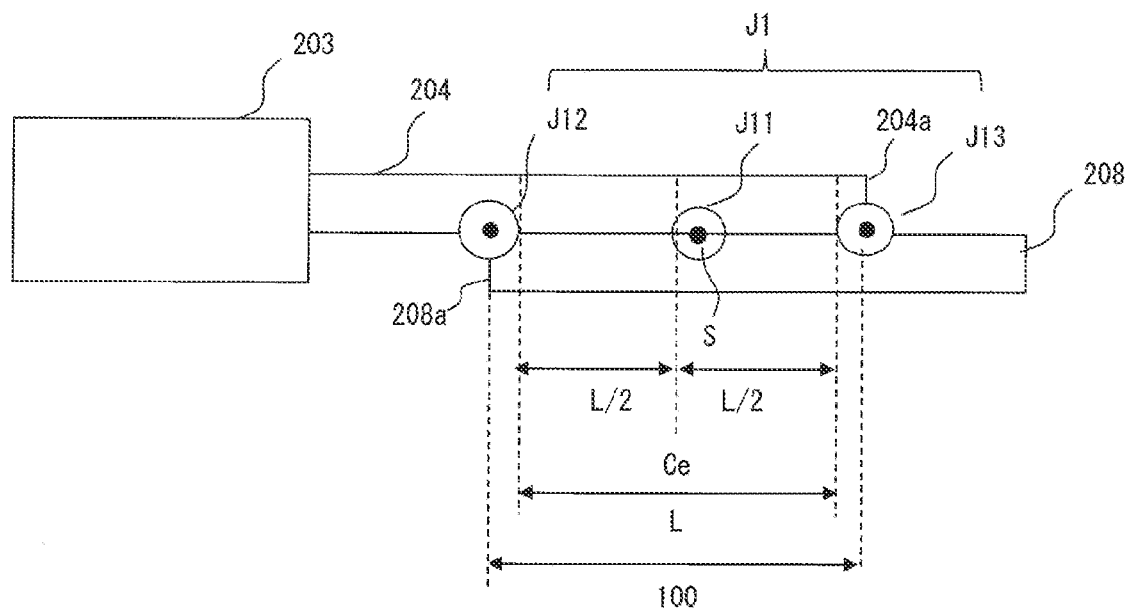
FIG. 2 is a schematic sectional view of a region of the temperature sensor where an element electrode wire and a sheath core wire are welded to each other.

The following describes a structure of the temperature sensor 200 where the element electrode wire 204 and the sheath core wire 208 are joined together by welding at a weld zone set J1, with reference to FIG. 2. As shown in FIG. 2, the weld zone set J1 includes three weld zones which are arranged over an overlap region 100 where the element electrode wire 204 and the sheath core wire 208 overlap with each other, in the longitudinal direction of the temperature sensor 200, specifically, in the longitudinal direction of the overlap sections of the element electrode wire 204 and the sheath core wire 208. More specifically, the weld zone set J1 is formed by laser welding in a direction perpendicular to the longitudinal direction, wherein the longitudinal direction is the direction in which the length L extends or the horizontal direction in FIG. 2, and wherein the perpendicular direction is a direction from a viewpoint from which an arrangement where the element electrode wire 204 and the sheath core wire 208 overlap with each other can be recognized as shown in FIG. 2, namely, the direction perpendicular to both of the vertical direction and the horizontal direction of FIG. 2, or, the direction from the front side of the sheet of FIG. 2 to the back side of the sheet of FIG. 2. The weld zone set J1 includes a second weld zone J12 at a front-side longitudinal end of the overlap region 100 in the longitudinal direction, and a third weld zone J13 at a rear-side longitudinal end of the overlap region 100 in the longitudinal direction, and a first weld zone J11 located between the second weld zone J12 and the third weld zone J13. A weld zone is defined as a region of base metal pieces which is melted and solidified by welding, wherein the weld zone is an enlarged region of a weld point or weld spot "S", as circled in FIG. 2.

Figure 3:
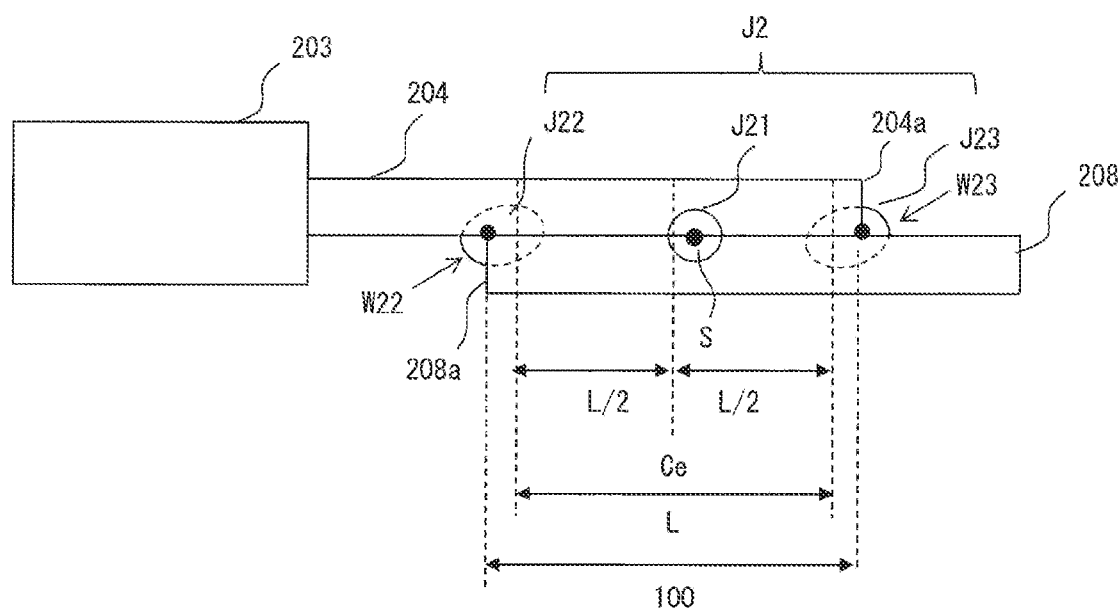
FIG. 3 is a schematic sectional view of a region of a temperature sensor according to a second embodiment of the present invention where an element electrode wire and a sheath core wire are welded to each other.

FIG. 3 shows a structure according to a second embodiment of the present invention where the element electrode wire 204 and the sheath core wire 208 are welded to each other. The following describes different features from the first embodiment, while omitting description of the same features as in the first embodiment. As shown in FIG. 3, the element electrode wire 204 is welded to the sheath core wire 208 at a weld zone set J2. As in the first embodiment, the weld zone set J2 includes three weld zones which are arranged over the overlap region 100 in the longitudinal direction. Specifically, the weld zone set J2 includes a second weld zone J22 at a front-side longitudinal end of the overlap region 100 in the longitudinal direction, and a third weld zone J23 at a rear-side longitudinal end of the overlap region 100 in the longitudinal direction, and a first weld zone J21 located between the second weld zone J22 and the third weld zone J23. The first weld zone J21 is formed by laser welding in a direction perpendicular to the longitudinal direction, wherein the longitudinal direction is the direction in which the length L extends or the horizontal direction in FIG. 3, and wherein the perpendicular direction is a direction from a viewpoint from which an arrangement where the element electrode wire 204 and the sheath core wire 208 overlap with each other can be recognized as shown in FIG. 3, namely, the direction perpendicular to both of the vertical direction and the horizontal direction of FIG. 3, or, the direction from the front side of the sheet of FIG. 3 to the back side of the sheet of FIG. 3, similar to the weld zones 311, 312, 313 of the first embodiment shown in FIG. 2. Accordingly, the direction of penetration of the first weld zone J21 is the perpendicular direction defined above, similar to the first weld zone J11 in FIG. 2. On the other hand, the second weld zone J22 is formed by laser welding by directing a laser beam in a direction W22 from the front-side longitudinal end surface of the sheath core wire 208 to the element electrode wire 204 (namely, a diagonal direction from a left bottom position to a right top position in FIG. 3), to reach the overlap section of the element electrode wire 204 in the overlap region 100. Accordingly, the direction of penetration of the second weld zone J22 is the direction from the front-side longitudinal end surface of the sheath core wire 208 to the overlap section of the element electrode wire 204 in the overlap region 100. On the other hand, the third weld zone J23 is formed by laser welding by directing a laser beam in a direction W23 from the rear-side longitudinal end surface of the element electrode wire 204 to the sheath core wire 208 (namely, a diagonal direction from a left top position to a right bottom position in FIG. 3), to reach the overlap section of the sheath core wire 208 in the overlap region 100. Accordingly, the direction of penetration of the third weld zone J23 is the direction from the rear-side longitudinal end surface of the element electrode wire 204 to the overlap section of the sheath core wire 208 in the overlap region 100.

In the first and second embodiments, the element electrode wire 204 and the sheath core wire 208 are made of different kinds of metal. In this example, the element electrode wire 204 is made of platinum (Pt) having a thermal expansion coefficient of about $9 \times 10^{-6}/°$ C., whereas the sheath core wire 208 is made of a kind of stainless steel (SUS-310S) having a thermal expansion coefficient of about $15 \times 10^{-6}/°$ C. Accordingly, if the element electrode wire 204 is welded to the sheath core wire 208 at only two points arranged in the longitudinal direction, the span or interval between two weld zones in the longitudinal direction is long so that a thermal stress tends to cause a large distortion. This is suppressed by the structures of the first and second embodiments where the welding between the element electrode wire 204 and the sheath core wire 208 is implemented by three weld zones so that each span between two adjacent weld zones becomes short.

Moreover, the formation of the weld zone at the front-side longitudinal end of the overlap region 100 and the weld zone at the rear-side longitudinal end of the overlap region 100 serves to strengthen the force binding the overlap region 100, and reduce the stress applied to the weld zones. Namely, the feature that both longitudinal ends of the overlap region 100 are welded, wherein separation tends to occur at the longitudinal ends of the overlap region 100, serves to enhance the binding force, and suppress vertical vibrations from being applied to the weld zones.

In the second embodiment, the second weld zone 322 is formed to extend in the direction W22 from the front-side longitudinal end surface of the sheath core wire 208 to the element electrode wire 204, to reach the overlap section of the element electrode wire 204 in the overlap region 100, and the third weld zone J23 is formed to extend in the direction W23 from the rear-side longitudinal end surface of the element electrode wire 204 to the sheath core wire 208, to reach the overlap section of the sheath core wire 208 in the overlap region 100. Accordingly, as compared to the first embodiment where the weld zones are formed by directing the laser beam in is the direction perpendicular to the longitudinal direction (from the front side to the back side of the sheet of FIG. 2), the depth of penetration of the second weld zone J22 and the third weld zone J23 at the longitudinal ends of the overlap region 100 is greater to enhance the strength of welding in the second embodiment. The regions of penetration are indicated by circles of solid or broken lines in FIGS. 2 and 3, where the regions of penetration of the second weld zone J22 and the third weld zone J23 in the second embodiment are deeper than those of the second weld zone J12 and the third weld zone J13 in the first embodiment.

Of the three weld zones, the intermediate weld zone may be located at a central position between the front-side weld zone and the rear-side weld zone. The feature that the first weld zone J11 (J21) is positioned at a central position Ce between the second weld zone J12 (J22) and the third weld zone J13 (J23) in the longitudinal direction, serves to equalize and thereby minimize the span between the first weld zone J11 (J21) and the second weld zone J12 (J22) and the span between the first weld zone J11 (J21) and the third weld zone J13 (J23), and thereby minimize the distortion due to thermal stresses. The central position Ce is a central point (L/2) of the length L between the second weld zone J12 (J22) and the third weld zone J13 (J23) in the longitudinal direction, wherein the melted and solidified portions are excluded from the length L. The weld spot S of the first weld zone J11 (J21) may be deviated from the central position Ce, if the central position Ce exits within the melted and solidified portion of the first weld zone J11 (J21) indicated by the circle in FIG. 2.

The first and second embodiments may be modified in various manners. For example, the electrode wires may be implemented by a lead frame or the like. The materials of the element electrode wire 204 and the sheath core wire 208 may be implemented by a different set of materials, if the material of the element electrode wire 204 and the material of the sheath core wire 208 are different from each other. The number of weld zones is not limited to three, but may be four or more.

Figure 4:
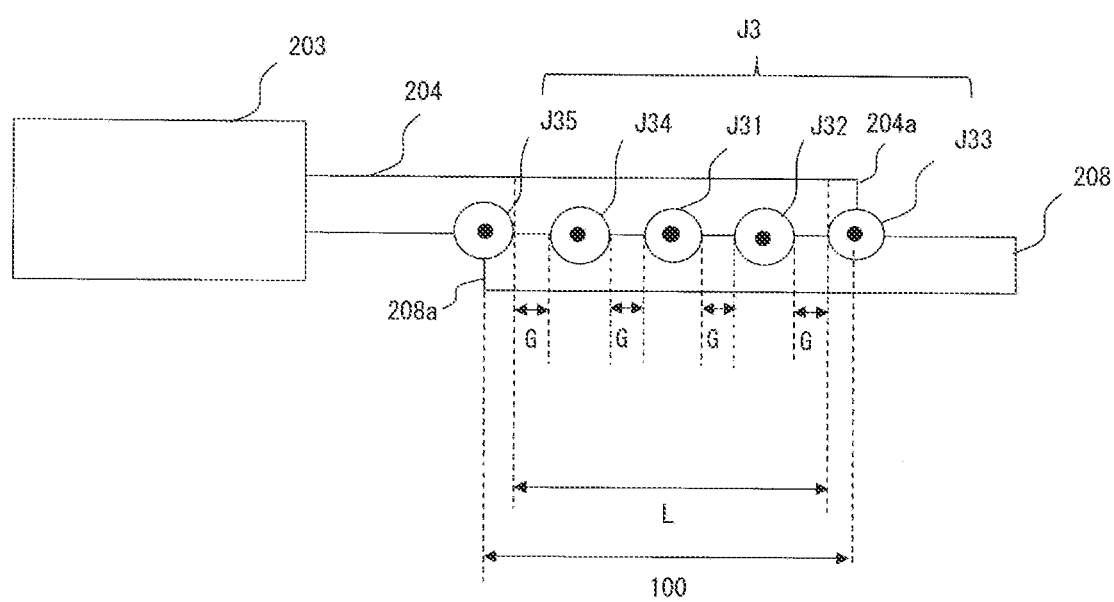
FIG. 4 is a schematic sectional view of a region of a temperature sensor according to a third embodiment of the present invention where an element electrode wire and a sheath core wire are welded to each other.

FIG. 4 shows a structure of a temperature sensor 200 according to a third embodiment of the present invention where the element electrode wire 204 and the sheath core wire 208 are welded to each other at five points. The following describes different features from the first embodiment, while omitting description of the same features as in the first embodiment. As shown in FIG. 4, the element electrode wire 204 is welded to the sheath core wire 208 at a weld zone set J3 which includes five weld zones arranged in the longitudinal direction of the overlap region 100 where the element electrode wire 204 overlaps with the sheath core wire 208. Specifically, the weld zone set J3 includes a fifth weld zone J35 at the front-side longitudinal end of the overlap region 100, a third weld zone J33 at the rear-side longitudinal end of the overlap region 100, a first weld zone J31 at the central position Ce between the fifth weld zone J35 and the third weld zone J33, and two further weld zones J34 and J32. The fourth weld zone J34 is positioned between the fifth weld zone J35 and the first weld zone J31. The second weld zone J32 is positioned between the third weld zone 333 and the first weld zone J31.

In the third embodiment, the weld zones J31-J35 are arranged and evenly spaced in the longitudinal direction of the overlap region 100. Namely, all of the spans G between two adjacent weld zones (the first weld zone J31 and the second weld zone J32, for example) are equal to each other, wherein the welded and solidified portions are excluded from each span G. This arrangement of the weld zones serves to equalize and thereby minimize the span, and thereby minimize the distortion due to thermal stresses. The welded and solidified portions vary in size. The variation is equal to about 1/10 or 10%. The variation is assumed to be equal to 1/10 of the maximum value M of the welded and solidified portion of each weld zone J31-J35. Accordingly, in consideration of the variation in size among the welded and solidified portions, the evenly spacing is assumed to be fulfilled if the variation of each span G is within ⅕ of the maximum value M.

The entire contents of Japanese Patent Application 2012-219337 filed Oct. 1, 2012 and Japanese Patent Application 2013-167256 filed Aug. 12, 2013 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A temperature sensor comprising:
a temperature-sensing element including:
a temperature-sensing portion; and
a pair of element electrode wires extending rearward from the temperature-sensing portion; and
a pair of second electrode wires welded to corresponding ones of the element electrode wires for taking an electric signal out of the temperature-sensing element, and made of a kind of metal having a different thermal expansion coefficient than the element electrode wires;
wherein:
each second electrode wire includes an overlap section overlapping with an overlap section of the corresponding element electrode wire over an overlap region in a longitudinal direction in which the overlap section of the each second electrode wire and the overlap section of the corresponding element electrode wire extend longitudinally;
the overlap section of each second electrode wire is welded to the overlap section of the corresponding element electrode wire at a plurality of weld zones, wherein the plurality of weld zones are arranged in the longitudinal direction;
the plurality of weld zones include:
a front-side weld zone at a front-side longitudinal end of the overlap region closer to the temperature-sensing portion; and
a rear-side weld zone at a rear-side longitudinal end of the overlap region farther from the temperature-sensing portion;
the front-side weld zone is formed on a front-side longitudinal end of the each second electrode wire by laser welding by directing a laser beam in a direction perpendicular to the longitudinal direction; and
the rear-side weld zone is formed on a rear-side longitudinal end of the corresponding element electrode wire by laser welding by directing a laser beam in a direction perpendicular to the longitudinal direction.

2. The temperature sensor as claimed in claim 1, wherein:
the front-side weld zone is formed to extend from a front-side longitudinal end surface of the each second electrode wire to the corresponding element electrode wire, and reach the overlap section of the corresponding element electrode wire; and
the rear-side weld zone is formed to extend from a rear-side longitudinal end surface of the corresponding element electrode wire to the each second electrode wire, and reach the overlap section of the each second electrode wire.

3. The temperature sensor as claimed in claim 2, wherein the plurality of weld zones include another weld zone.

4. The temperature sensor as claimed in claim 2, wherein the plurality of weld zones include a central weld zone at a substantially central position between the front-side weld zone and the rear-side weld zone in the longitudinal direction.

5. The temperature sensor as claimed in claim 2, wherein the plurality of weld zones are substantially evenly spaced in the longitudinal direction.

6. The temperature sensor as claimed in claim 1, wherein the plurality of weld zones include another weld zone.

7. The temperature sensor as claimed in claim 1, wherein the plurality of weld zones include a central weld zone at a substantially central position between the front-side weld zone and the rear-side weld zone in the longitudinal direction.

8. The temperature sensor as claimed in claim 1, wherein the plurality of weld zones are substantially evenly spaced in the longitudinal direction.

* * * * *